US012728733B2

(12) United States Patent
Wei

(10) Patent No.: US 12,728,733 B2
(45) Date of Patent: Sep. 8, 2026

(54) SLIP CONTROL METHOD AND APPARATUS, ELECTRONIC DEVICE AND STORAGE MEDIUM

(71) Applicant: GREAT WALL MOTOR COMPANY LIMITED, Baoding (CN)

(72) Inventor: Bing Wei, Baoding (CN)

(73) Assignee: GREAT WALL MOTOR COMPANY LIMITED, Baoding (CN)

( * ) Notice: Subject to any disclaimer, the term of this patent is extended or adjusted under 35 U.S.C. 154(b) by 67 days.

(21) Appl. No.: 18/856,657

(22) PCT Filed: Apr. 4, 2023

(86) PCT No.: PCT/CN2023/086181
§ 371 (c)(1),
(2) Date: Oct. 14, 2024

(87) PCT Pub. No.: WO2023/197909
PCT Pub. Date: Oct. 19, 2023

(65) Prior Publication Data

US 2025/0242702 A1 Jul. 31, 2025

(30) Foreign Application Priority Data

Apr. 15, 2022 (CN) ........................ 202210396843.2

(51) Int. Cl.
*B60L 15/20* (2006.01)

(52) U.S. Cl.
CPC ..... *B60L 15/2072* (2013.01); *B60L 2240/421* (2013.01); *B60L 2240/423* (2013.01);
(Continued)

(58) Field of Classification Search
CPC .................................................. B60L 15/2072
See application file for complete search history.

(56) References Cited

U.S. PATENT DOCUMENTS 7,499,787 B2 * 3/2009 Hrovat .................. F02D 11/105 701/87
2006/0080022 A1 4/2006 Hrovat et al.
(Continued)

FOREIGN PATENT DOCUMENTS

CN 106627580 A 5/2017
CN 106740266 A 5/2017
(Continued)

OTHER PUBLICATIONS

European Search Report for Application No. 23787554.7, European Patent Office, issued on Jul. 9, 2025, pp. 1-10.

*Primary Examiner* — Michael A Berns
(74) *Attorney, Agent, or Firm* — Bayramoglu Law Offices LLC

(57) ABSTRACT

A slip control method and apparatus, an electronic device and a storage medium are provided. The slip control method includes: acquiring a wheel speed of each wheel of a vehicle in response to a working condition that the vehicle is in a launch starting execution stage; determining a slip working condition of the vehicle according to the wheel speed of the wheel; acquiring one or more motor operating parameters of the vehicle, and determining a slip output torque of the vehicle according to the slip working condition of the vehicle and the motor operating parameters; and adjusting an actual output torque of the vehicle according to the slip output torque, and controlling the motor to operate at the adjusted actual output torque.

8 Claims, 2 Drawing Sheets

(52) U.S. Cl.
CPC ... *B60L 2240/461* (2013.01); *B60L 2240/465* (2013.01); *B60L 2240/48* (2013.01)

(56) References Cited

U.S. PATENT DOCUMENTS

| | | | | |
|---|---|---|---|---|
| 2014/0121870 | A1* | 5/2014 | Lee | B60W 20/10 477/3 |
| 2016/0090005 | A1* | 3/2016 | Drako | B60W 10/16 701/22 |
| 2025/0242702 | A1* | 7/2025 | Wei | B60L 15/2072 |

FOREIGN PATENT DOCUMENTS

| | | | |
|---|---|---|---|
| CN | 108162800 | A | 6/2018 |
| CN | 110588370 | A | 12/2019 |
| CN | 111086500 | A | 5/2020 |
| CN | 115284890 | A | 11/2022 |
| GB | 2577090 | A | 3/2020 |

* cited by examiner

Information Collection Module Of Vehicle

VCU

Launch Starting Preparation Stage Functional Module

Launch Starting Execution Stage Functional Module

Torque Instruction

MCU

Anti-slip Control Module

Electric Machine Control Module

Actual Torque Of Electric Machine

SLIP CONTROL METHOD AND APPARATUS, ELECTRONIC DEVICE AND STORAGE MEDIUM

CROSS REFERENCE TO THE RELATED APPLICATIONS

This application is the national phase entry of International Application No. PCT/CN2023/086181, filed on Apr. 4, 2023, which is based upon and claims priority to Chinese Patent Application No. 202210396843.2, filed on Apr. 15, 2022, the entire contents of which are incorporated herein by reference.

TECHNICAL FIELD

The present disclosure relates to the field of vehicle anti-skid technologies, and in particular to a slip control method and apparatus, an electronic device and a storage medium.

BACKGROUND

A launch starting function aims to activate an electric drive system to output with maximum torque or maximum power when a vehicle is stationary to acceleration, thereby shortening an acceleration time of the whole vehicle. However, since the vehicle outputs with the maximum power, the vehicle is prone to slip, resulting in instability of the vehicle. Therefore, in order to reduce the probability of slip in the process of launch starting, corresponding slip control strategies are adopted for control.

An existing slip control strategy is to calculate a slip output torque based on a rate of change of a rotational speed of a motor, that is, the rate of change of the rotational speed of the motor is obtained by dividing a collection period by a difference between an engine revolution at a current collection time and an engine revolution at a previous collection time. However, under the premise that the rate of change of the rotational speed of the motor is too fast and the collection period can no longer be optimized, the rate of change of the rotational speed of the motor calculated using this method is inaccurately, resulting in inaccurate calculation of the slip output torque, and further reducing the driving experience and comfort of a user.

SUMMARY

Embodiments of the present disclosure provide a slip control method and apparatus, an electronic device and a storage medium, so as to solve or partially solve the problem of inaccurate slip output torque in the above-mentioned background art.

In order to solve the above-mentioned technical problems, the present disclosure is realized as follows.

In a first aspect, an embodiment of the present disclosure provides a slip control method, including:

- acquiring a wheel speed of each wheel of a vehicle in response to a working condition that the vehicle is in a launch starting execution stage;
- determining a slip working condition of the vehicle according to the wheel speed of the wheel;
- acquiring one or more motor operating parameters of the vehicle, and determining a slip output torque of the vehicle according to the slip working condition of the vehicle and the motor operating parameters; and
- adjusting an actual output torque of the vehicle according to the slip output torque, and controlling the motor to operate at the adjusted actual output torque.

Optionally, the step of determining the slip working condition of the vehicle according to the wheel speed of the wheel includes:

- if a rotational speed difference between a rotational speed of a front wheel and a rotational speed of a rear wheel on any same side of the vehicle is greater than a first threshold, determining that the slip working condition of the vehicle is a wheel-on-one-side slip working condition; and
- if a rotational speed of a left rear wheel of the vehicle is greater than a preset second threshold and a rotational speed of a right rear wheel of the vehicle is greater than a preset third threshold, determining that the slip working condition of the vehicle is a wheel-on-two-side slip working condition.

Optionally, the step of acquiring the motor operating parameters of the vehicle, and determining the slip output torque of the vehicle according to the slip working condition of the vehicle and the motor operating parameters includes:

- if the slip working condition of the vehicle is the wheel-on-one-side slip working condition, acquiring a real-time rotational speed of the motor and a gear request;
- determining a target torque gradient according to a motor rotational speed level to which the real-time rotational speed of the motor belongs and a gear request type; and
- acquiring an initial output torque of the vehicle, and correcting the initial output torque according to the target torque gradient to obtain a slip output torque in the wheel-on-one-side slip working condition.

Optionally, the step of determining the target torque gradient according to the motor rotational speed level to which the real-time rotational speed of the motor belongs and the gear request type includes:

- if the gear request is an upshift request, determining a loading torque gradient with a corresponding level according to the motor rotational speed level; and
- if the gear request is a downshift request, determining an unloading torque gradient with a corresponding level according to the motor rotational speed level,
- wherein the motor rotational speed level is matched with a level of the loading torque gradient and a level of the unloading torque gradient, the unloading torque gradient changes linearly with a change of the motor rotational speed level, and the loading torque gradient changes linearly with the change of the motor rotational speed level.

Optionally, the step of acquiring the motor operating parameters of the vehicle, and determining the slip output torque of the vehicle according to the slip working condition of the vehicle and the motor operating parameters includes:

- if the slip working condition of the vehicle is the wheel-on-two-side slip working condition, acquiring an operating current of the motor in a steady state working condition; and
- acquiring a slip output torque in the wheel-on-two-side slip working condition according to the operating current of the motor in the steady state working condition and preset motor parameters.

Optionally, a calculation formula of acquiring the slip output torque in the wheel-on-two-side slip working condition according to the operating current of the motor in the steady state working condition and preset motor parameters is as follows:

$$T_{rq} = n_p[\Phi_f i_q + (L_d - L_q)i_d i_q],$$

wherein $T_{rq}$ is the slip output torque, $n_p$ is a quantity of pole pairs of the motor, $\Phi_f$ is a flux linkage of a permanent magnet, $L_d$ is a d-axis inductance of a stator winding, $L_q$ is q-axis inductance of the stator winding, $i_d$ is a d-axis current of the motor in the steady state working condition, and $i_q$ is a q-axis current of the motor in the steady state working condition.

Optionally, the step of adjusting an actual output torque of the vehicle according to the slip output torque includes:

calculating a torque difference of the slip output torque and a target output torque;

if the torque difference is greater than a fourth threshold, determining the slip output torque as the actual output torque; and if the torque difference is less than or equal to the fourth threshold, determining the target output torque as the actual output torque.

A second aspect of the embodiments of the present disclosure provides a slip control apparatus, including:

an acquisition unit configured to acquire a wheel speed of each wheel of a vehicle in response to a working condition that the vehicle is in a launch starting execution stage;

a first determination unit configured to determine a slip working condition of the vehicle according to the wheel speed of the wheel;

a second determination unit configured to acquire one or more motor operating parameters of the vehicle, and determine a slip output torque of the vehicle according to the slip working condition of the vehicle and the motor operating parameters; and an execution unit configured to adjust an actual output torque of the vehicle according to the slip output torque, and control the motor to operate at the adjusted actual output torque.

A third aspect of the embodiments of the present disclosure provides an electronic device, including a processor, a communication interface, a memory and a communication bus, wherein the processor, the communication interface and the memory communicate with each other through the communication bus;

the memory is configured to store a computer program; and the processor is configured to, when executing the computer program stored in the memory, implement the method provided in the first aspect of the embodiments of the present disclosure.

A fourth aspect of the embodiments of the present disclosure provides a computer-readable storage medium, having a computer program stored thereon, wherein when the computer program is executed by a processor, the method provided in the first aspect of the embodiments of the present disclosure is implemented.

The embodiments of the present disclosure have the following advantages: first, when a vehicle is in the working condition of the launch starting execution stage, the wheel speed of each wheel of the vehicle is obtained; then, the slip working condition of the vehicle is determined according to the wheel speed of each wheel, one or more motor operating parameters of the vehicle are obtained, and the slip output torque of the vehicle is determined according to the slip working condition of the vehicle and the motor operating parameters; and finally, the actual output torque of the vehicle is adjusted according to the slip output torque, and the motor is controlled to operate at the adjusted actual output torque. In the present disclosure, the slip working condition of the vehicle is divided according to the wheel speed of each wheel, and the slip output torque is calculated according to different slip working conditions in conjunction with actual motor operating parameters. Since a rate of change of the rotational speed of the motor is not used as a reference factor of the slip output torque, the calculation result will not be impacted by the rate of change of the rotational speed of the motor.

In the embodiments of the present disclosure, the vehicle in the slip working condition can be effectively controlled, thereby improving the driving experience and comfort of the vehicle.

In the embodiments of the present disclosure, it is unnecessary to increase the hardware cost, thereby greatly reducing the use cost and improving the universality.

BRIEF DESCRIPTION OF THE DRAWINGS

To more clearly illustrate the technical solutions in the embodiments of the present disclosure or in prior art, a brief introduction will now be given to the appended drawings that are necessary for the description of the embodiments or the prior art. It is evident that the appended drawings described below are merely some embodiments of the present disclosure, and for those skilled in the art, other drawings may be obtained based on these without expenditure of creative labor.

DETAILED DESCRIPTION OF THE EMBODIMENTS

The following will combine the appended drawings in the embodiments of the present disclosure to provide a clear and complete description of the technical solutions in the embodiments of the present disclosure. It is evident that the described embodiments are only a part of the embodiments of the present disclosure, not all of them. All other embodiments obtained by persons skilled in the field without expenditure of creative labor based on the embodiments in the present disclosure fall within the scope of protection of the present disclosure.

A slip phenomenon of a vehicle mainly occurs at a launch starting execution stage, and therefore, the core concept of the present disclosure is how to accurately calculate a slip output torque without being based on a rate of change of a rotational speed of a motor (also referred as electric machine).

Figures 1, 2:
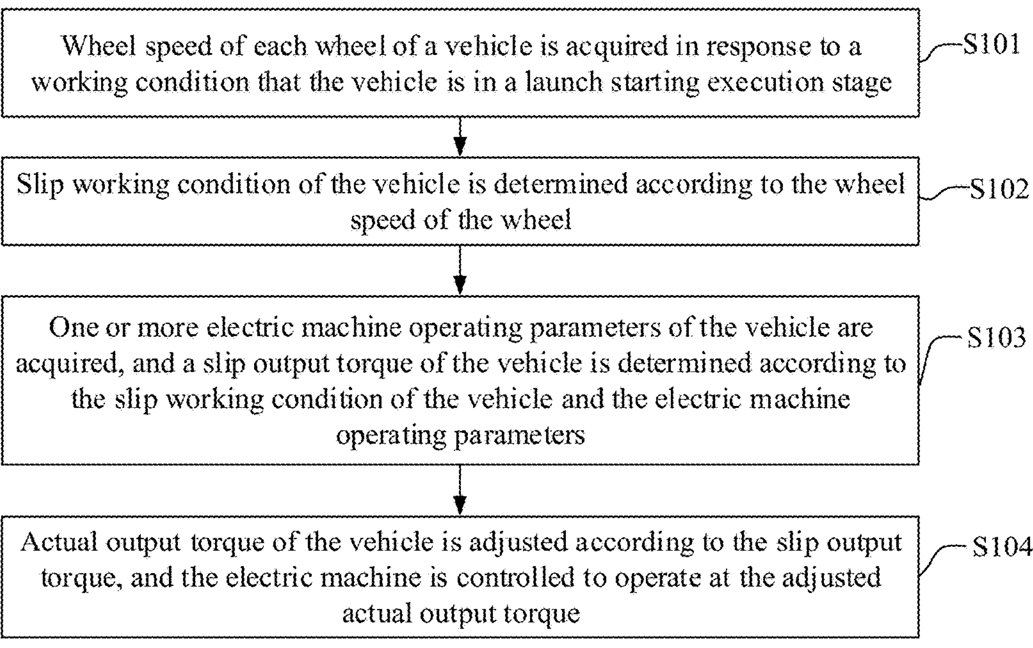
FIG. 1 is a flowchart of steps of a slip control method according to an embodiment of the present disclosure.
FIG. 2 is a block diagram of an anti-slip control system according to an embodiment of the present disclosure.

An embodiment of the present disclosure provides a slip control method. Referring to FIG. 1, FIG. 1 shows a flowchart of steps of a slip control method according to an embodiment of the present disclosure. The method includes the following steps.

S101, a wheel speed of each wheel of a vehicle is acquired in response to a working condition that the vehicle is in a launch starting execution stage.

In the present embodiment, a driving signal of the vehicle is collected in real time by an information collection module disposed on the vehicle. The information collection module can be various sensors. The driving signal of the vehicle at least includes a vehicle speed signal, an accelerator pedal depth, gear information, a braking state, a rotational speed signal and fault information of a motor and the wheel speed of each wheel. When recognizing that a brake pedal and an accelerator pedal are stepped at the same time, a vehicle control unit (VCU) determines that the vehicle enters a launch starting preparation stage; after the brake pedal is released, the VCU determines that a function at the launch starting execution stage of the vehicle is activated, that is, it is determined that the vehicle enters the working condition of the launch starting execution stage, and in this working condition, the vehicle outputs the maximum torque. However, if a slip phenomenon of the vehicle occurs at the time and the vehicle further outputs the maximum torque, it is greatly possible to cause serious accidents such as rollover and out of control of the vehicle. Therefore, in order to avoid the above-mentioned situations and ensure the driving safety of a user, when the vehicle is in the working condition of the launch starting execution stage, it is necessary to acquire the wheel speed of each wheel collected by the information collection module, and the acquired wheel speed of each wheel is used for determining whether the slip phenomenon of the vehicle occurs and a specific slip type to which the slip phenomenon belongs.

S102, a slip working condition of the vehicle is determined according to the wheel speed of the wheel.

In the present embodiment, whether the slip working condition of the vehicle occurs and the specific slip type to which the slip working condition belongs are determined according to the wheel speed of each wheel, such that different slip output torque calculation strategies are executed according to a type of the slip working condition, the slip output torque can be calculated according to the specific slip working condition, that is, classified calculation is performed according to the different conditions, and therefore, the calculation result is more accurate. A method for determining the specific type of the slip working condition according to the wheel speed of each wheel of the vehicle after the wheel speed of each wheel collected by the information collection module of the vehicle is acquired can specifically include the following steps:

S102-1, if a rotational speed difference between a rotational speed of a front wheel and a rotational speed of a rear wheel on any same side of the vehicle is greater than a first threshold, it is determined that the slip working condition of the vehicle is a wheel-on-one-side slip working condition; and

S102-2, if a rotational speed of a left rear wheel of the vehicle is greater than a preset second threshold and a rotational speed of a right rear wheel of the vehicle is greater than a preset third threshold, it is determined that the slip working condition of the vehicle is a wheel-on-two-side slip working condition.

In the implementations from S102-1 to S102-2, after a wheel speed $L_{IB}$ of the left rear wheel, a wheel speed $L_{IF}$ of a left front wheel, a wheel speed $R_{IB}$ of a right rear wheel and a wheel speed $R_{IF}$ of a right front wheel are acquired, if the rotational speeds of any front and rear wheels on the same side are used as examples, a rotational speed difference A of the wheel speed $L_{IB}$ of the left rear wheel and the wheel speed $L_{IF}$ of the left front wheel is greater than a preset wheel-on-one-side slip wheel speed threshold $L_{thres}$, a wheel-on-one-side slip wheel speed threshold is acquired by complete vehicle calibration, or a rotational speed difference B of the wheel speed $R_{IB}$ of the right rear wheel and the wheel speed $R_{IF}$ of the right front wheel is greater than the preset wheel-on-one-side slip wheel speed threshold $L_{thres}$, it is determined that the slip working condition of the vehicle is the wheel-on-one-side slip working condition. For the determination of the wheel-on-two-side slip, the front and rear wheels both slip during wheel-on-two-side slip determination, and therefore, there is no great difference in rotational speeds of the front and rear wheels, an erroneous determination condition will occur by adopting a wheel-on-two-side slip determination method; and the wheel-on-two-side slip is often aimed at the rear wheels, therefore, the rotational speeds of the rear wheels are compared with a preset calibrated threshold, and then, the slip working condition is determined more accurately. That is, if the wheel speed $L_{IB}$ of the left rear wheel is greater than a preset wheel-on-two-side slip wheel speed threshold $L_{thres1}$, and the wheel speed $R_{IB}$ of the right rear wheel of the vehicle is greater than a preset wheel-on-two-side slip wheel speed threshold $L_{thres2}$, it is determined that the slip working condition of the vehicle is the wheel-on-two-side slip working condition, wherein the wheel-on-two-side slip wheel speed threshold $L_{thres1}$ and the wheel-on-two-side slip wheel speed threshold $L_{thres2}$ are both calibrated values, that is, they are estimated according to a road adhesion coefficient and a slip rate curve.

By means of the different determination methods, the slip type is divided according to the rotational speed of each wheel, and the different slip output torque calculation strategies are specified according to the slip type, such that a calculation result is matched with an actual scenario so as to be more accurate.

S103, one or more motor operating parameters of the vehicle are acquired, and a slip output torque of the vehicle is determined according to the slip working condition of the vehicle and the motor operating parameters.

In the present embodiment, after the slip working condition of the vehicle is determined according to the wheel speed of each wheel, the slip output torque calculation strategies matched with the corresponding different slip working conditions are executed, and then the slip output torque of the vehicle is determined in conjunction with real-time motor operating parameters. The rate of change of the rotational speed of the motor is not used as the reference factor of the slip output torque, and therefore, the calculation result cannot be impacted by the rate of change of the rotational speed of the motor. The process that the slip output torque of the vehicle is determined according to the slip working condition of the vehicle and the motor operating parameters is divided into a slip output torque calculation process in the wheel-on-one-side slip working condition and a slip output torque calculation process in the wheel-on-two-side slip working condition.

For the slip output torque calculation process in the wheel-on-one-side slip working condition, after it is determined that the vehicle is in the wheel-on-one-side slip working condition, a calculation method for the slip output torque in the wheel-on-one-side slip working condition can include the following steps:

S103-1, the step of acquiring the motor operating parameters of the vehicle, and determining the slip output torque of the vehicle according to the slip working condition of the vehicle and the motor operating parameters includes:

S103-2, if the slip working condition of the vehicle is the wheel-on-one-side slip working condition, a real-time rotational speed of the motor and a gear request are acquired;

S103-3, a target torque gradient is determined according to a motor rotational speed level to which the real-time rotational speed of the motor belongs and a gear request type; and S103-4, an initial output torque of the vehicle is acquired, and the initial output torque is corrected according to the target torque gradient to obtain a slip output torque in the wheel-on-one-side slip working condition.

In the present implementation, when it is determined that the vehicle is in the wheel-on-one-side slip working condition, the real-time rotational speed of the motor of the vehicle and a gear request of a user are acquired, the gear request of the user includes an upshift request and a downshift request, the target torque gradient includes a load torque gradient and an unload torque gradient, the real-time rotational speed of the motor is divided into a plurality of rotational speed levels from low to high, and the target torque gradient is determined according to the rotational speed level to which the real-time rotational speed of the motor belongs and the gear request type. The method for determining the target torque gradient according to the motor rotational speed level to which the real-time rotational speed of the motor belongs and the gear request type can include the following steps:

S103-3-1, if the gear request is an upshift request, a loading torque gradient with a corresponding level is determined according to the motor rotational speed level; and S103-3-2, if the gear request is a downshift request, an unloading torque gradient with a corresponding level is determined according to the motor rotational speed level, S103-3-3, the motor rotational speed level is matched with a level of the loading torque gradient and a level of the unloading torque gradient, the unloading torque gradient changes linearly with a change of the motor rotational speed level, and the loading torque gradient changes linearly with the change of the motor rotational speed level.

In the present implementation, if a motor rotational speed range to which the real-time rotational speed of the motor belongs is a first rotational speed range, and the gear request is the upshift request, the target torque gradient is determined as a first-level loading torque gradient.

If the motor rotational speed range to which the real-time rotational speed of the motor belongs is the first rotational speed range, and the gear request is the downshift request, the target torque gradient is determined as a first-level unloading torque gradient.

If the motor rotational speed range to which the real-time rotational speed of the motor belongs is a second rotational speed range, and the gear request is the upshift request, the target torque gradient is determined as a second-level loading torque gradient.

If the motor rotational speed range to which the real-time rotational speed of the motor belongs is the second rotational speed range, and the gear request is the downshift request, the target torque gradient is determined as a second-level unloading torque gradient.

If the motor rotational speed range to which the real-time rotational speed of the motor belongs is a third rotational speed range, and the gear request is the upshift request, the target torque gradient is determined as a third-level loading torque gradient.

If the motor rotational speed range to which the real-time rotational speed of the motor belongs is the third rotational speed range, and the gear request is the downshift request, the target torque gradient is determined as a third-level unloading torque gradient.

If the motor rotational speed range to which the real-time rotational speed of the motor belongs is a fourth rotational speed range, and the gear request is the upshift request, the target torque gradient is determined as a fourth-level loading torque gradient.

If the motor rotational speed range to which the real-time rotational speed of the motor belongs is the fourth rotational speed range, and the gear request is the downshift request, the target torque gradient is determined as a fourth-level unloading torque gradient, wherein torque gradients of the first-level loading torque gradient to the fourth-level loading torque gradient are progressively increased, and torque gradients of the first-level unloading torque gradient to the fourth-level unloading torque gradient are progressively increased.

For example, if the real-time rotational speed of the motor is greater than a rotational speed threshold Speed_1, that is, the real-time rotational speed of the motor is within the first rotational speed range, and the motor rotational speed level is a first level, the corresponding target slip output torque gradient is NegSlope_1, and the loading torque gradient is PosSlope_1;

if the real-time rotational speed of the motor is greater than Speed_2 and is less than Speed_1, that is, the real-time rotational speed of the motor is within the second rotational speed range, and the motor rotational speed level is a second level, the corresponding target slip output torque gradient is NegSlope_2, and the loading torque gradient is PosSlope_2;

if the real-time rotational speed of the motor is greater than Speed_3 and is less than Speed_2, that is, the real-time rotational speed of the motor is within the third rotational speed range, and the motor rotational speed level is a third level, the corresponding target slip output torque gradient is NegSlope_3, and the loading torque gradient is PosSlope_3;

if the real-time rotational speed of the motor is greater than Speed_4 and is less than Speed_3, that is, the real-time rotational speed of the motor is within the fourth rotational speed range, and the motor rotational speed level is a fourth level, the corresponding target slip output torque gradient is NegSlope_4, and the loading torque gradient is PosSlope_4;

wherein loading torque gradients are in a relation that PosSlope_1<PosSlope_2<PosSlope_3<PosSlope_4, and unloading torque gradients are in a relation that NegSlope_1<NegSlope_2<NegSlope_3<NegSlope_4.

The loading torque gradient PosSlope_1 can be understood as that when the real-time rotational speed of the motor is within the first rotational speed range, a corresponding target loading torque gradient is PosSlope_1*N/s, that is, if a target torque at the current time T1 is A(N), a target torque at the next time T2 is expressed as formula 1:

$$B(N)=A(N)+(\text{PosSlope\_1}*N/s)*(T2-T1). \quad (1)$$

Similarly, the unloading torque gradient NegSlope_1 can be understood as that when the real-time rotational speed of the motor is within the first rotational speed range, a corresponding target unloading torque gradient is NegSlope_1*N/s, that is, if a target torque at the current time T1 is A(N), a target torque at the next time T2 is expressed as formula 1:

$$B(N)=A(N)-(\text{NegSlope\_1}*N/s)*(T2-T1). \quad (2)$$

The unloading torque gradient is used for representing a capability of reduction from the current torque to the target torque, the higher the level of the unloading torque gradient is, the shorter the time required for reduction from the current torque to the target torque is; and Similarly, the loading torque gradient is used for representing a capability of increase from the current torque to the target torque, the higher the level of the loading torque gradient is, the shorter the time required for increase from the current torque to the target torque is. Actual values of the above-mentioned loading torque gradient and unloading torque gradient are obtained by complete vehicle calibration.

It can be understood that after the target loading torque gradient PosSlope and unloading torque gradient NegSlope are determined, the output torque of the vehicle can be corrected and compensated in conjunction with the current target torque gradient and the correction and compensation time, such that a Motor Control Unit (MCU) rapidly and directly adjusts the slip output torque by means of different rotational speed segments, thereby controlling a torque actually outputted in the wheel-on-one-side slip working condition.

For the slip output torque calculation process in the wheel-on-two-side slip working condition, after it is determined that the vehicle is in the wheel-on-two-side slip working condition, a calculation method for the slip output torque in the wheel-on-one-side slip working condition can include the following steps:

after it is determined that the vehicle is in the wheel-on-two-side slip working condition, a calculation method for the slip output torque in the wheel-on-one-side slip working condition can include the following steps:

S103-5, the step of acquiring the motor operating parameters of the vehicle, and determining the slip output torque of the vehicle according to the slip working condition of the vehicle and the motor operating parameters further includes:

S103-6, if the slip working condition of the vehicle is the wheel-on-two-side slip working condition, an operating current of the motor in a steady state working condition is acquired; and

S103-7, a slip output torque in the wheel-on-two-side slip working condition is acquired according to the operating current of the motor in the steady state working condition and preset motor parameters.

In the present implementation, for the calculation for the slip output torque in the wheel-on-two-side slip working condition, the operating current of the motor in the steady state working condition is acquired, if the operation parameters of the corresponding motor at the current time do not fluctuate or change as comparison with the previous time, it is indicated that the motor is in a steady operation condition, the operating current, i.e., d-axis and q-axis currents, of the motor is acquired, in an electromagnetic field, a direction of a magnetic field of a rotor is d axis, a direction perpendicular to the magnetic field of the rotor is q axis, and the slip output torque in the wheel-on-two-side slip working condition can be determined according to a calculation formula for an electromagnetic torque of a permanent magnet synchronous motor shown in formula 3:

$$T_{rq}=n_p[\Phi_f i_q+(L_d-L_q)i_d i_q] \quad (3)$$

where $T_{rq}$ is the slip output torque, $n_p$ is a quantity of pole pairs of the motor, $\Phi_f$ is a flux linkage of a permanent magnet, $L_d$ is a d-axis inductance of a stator winding, $L_q$ is q-axis inductance of the stator winding, $i_d$ is a d-axis current of the motor in the steady state working condition, and $i_q$ is a q-axis current of the motor in the steady state working condition.

S104, an actual output torque of the vehicle is adjusted according to the slip output torque, and the motor is controlled to operate at the adjusted actual output torque.

In the present embodiment, when the vehicle is in the working condition of the launch starting execution stage, if the vehicle is in a slip state and operates with the maximum power output according to a torque instruction outputted by the VCU, the situation that the vehicle is out of control will occur. Therefore, in order to adjust the slip state of the vehicle and enable the vehicle to be in a normal operation state in time, the outputted target output torque needs to be corrected on the basis of the calculated slip output torque, such that the adjusted actual output torque of the vehicle is outputted, and the motor is controlled to operate at the adjusted actual output torque. The step that an actual output torque of the vehicle is adjusted according to the slip output torque after the slip output torque in the corresponding condition is determined according to different slip working conditions includes:

S104-1, a torque difference between the slip output torque and a target output torque is calculated;

S104-2, if the torque difference is greater than a fourth threshold, the slip output torque is determined as the actual output torque; and

S104-3, if the torque difference is less than or equal to the fourth threshold, the target output torque is determined as the actual output torque.

In the present implementation, no matter whether the vehicle is in the wheel-on-one-side slip working condition or the wheel-on-two-side slip working condition, after the corresponding slip output torque is determined according to the specific slip working condition of the vehicle, the target output torque is acquired, the target output torque is an output torque outputted by the VCU and matched with a target gear of the user, the target output torque set by the user by means of the VCU is compared with the calculated slip output torque; if the difference is less than or equal to a preset difference threshold, in order to meet a power demand of the user, the target output torque is determined as the actual output torque; if the difference is greater than the preset difference threshold and the target output torque is still determined as the actual output torque, accidents may occur; and therefore, in view of safety, the slip output torque is determined as the actual output torque, which ensures the use demand of the user and the driving safety.

In the implementations S101 to S104, the slip working condition of the vehicle is divided according to the wheel speed of each wheel, and the slip output torque is calculated according to the different slip working conditions in conjunction with the actual operation parameters of the motor, which, compared with the prior art, lies in that a rate of change of the rotational speed of the motor is not used as a reference factor of the slip output torque, and therefore, a calculation result is not impacted by the rate of change of the rotational speed of the motor. Therefore, the calculated slip output torque is more accurate, the control on the slip vehicle is more accurate, and the use safety and use experience of the user are also prompted.

In one feasible implementation, the method including S101 to S104 in the present disclosure will be specifically described with an anti-slip control system shown in FIG. 2 as an example. In the anti-slip control system, the information collection module of the vehicle collects real-time operation parameters of the vehicle and sends the real-time operation parameters of the vehicle to the VCU and the MCU of the vehicle by means of a CAN bus of the vehicle; the VCU at least includes a launch starting preparation stage functional module and a launch starting execution stage functional module which successively determine whether the function at the launch starting preparation stage and the function at the launch starting execution stage are activated according to the real-time operation parameters of the vehicle, and when it is determined that the function at the launch starting execution stage is activated, the VCU outputs a target torque instruction to the MCU; and the MCU at least includes an anti-slip control module and a motor control module, the anti-slip control module is configured to divide the slip working condition of the vehicle according to the wheel speed of each wheel, calculate the slip output torque according to different slip working conditions in conjunction with the actual operation parameters of the motor, correct, according to the slip output torque, the target torque outputted by the VCU, and send the corrected target torque to the motor control module, and the motor control module controls the motor according to the corrected target torque. Thus, a slip process of the vehicle is corrected and processed, and the driving safety of the user is ensured.

Figure 3:
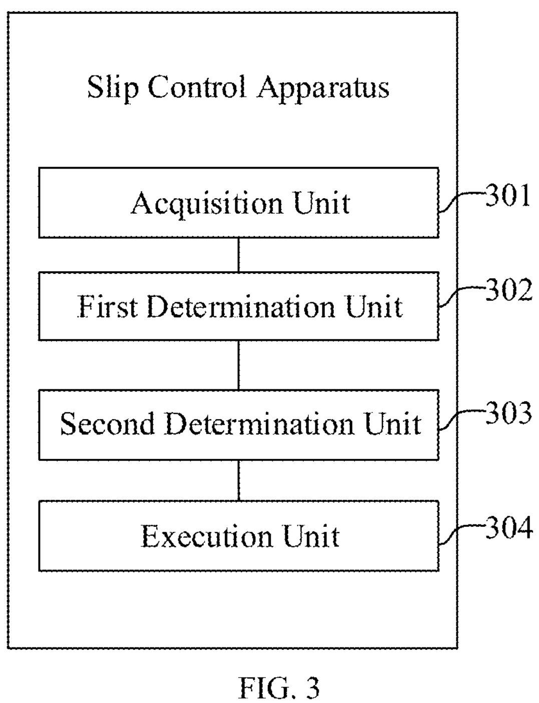
FIG. 3 is a schematic diagram of modules of a slip control apparatus according to an embodiment of the present disclosure.

An embodiment of the present disclosure provides a slip control apparatus, and functional modules thereof are shown in FIG. 3. The apparatus includes:

- an acquisition unit 301 configured to acquire a wheel speed of each wheel of a vehicle in response to a working condition that the vehicle is in a launch starting execution stage;
- a first determination unit 302 configured to determine a slip working condition of the vehicle according to the wheel speed of the wheel;
- a second determination unit 303 configured to acquire one or more motor operating parameters of the vehicle, and determine a slip output torque of the vehicle according to the slip working condition of the vehicle and the motor operating parameters; and
- an execution unit 304 configured to adjust an actual output torque of the vehicle according to the slip output torque, and control the motor to operate at the adjusted actual output torque.

In one feasible implementation, the first determination unit 302 includes:

- a first determination subunit configured to if a rotational speed difference between a rotational speed of a front wheel and a rotational speed of a rear wheel on any same side of the vehicle is greater than a first threshold, determine that the slip working condition of the vehicle is a wheel-on-one-side slip working condition; and
- a second determination subunit configured to if a rotational speed of a left rear wheel of the vehicle is greater than a preset second threshold and a rotational speed of a right rear wheel of the vehicle is greater than a preset third threshold, determine that the slip working condition of the vehicle is a wheel-on-two-side slip working condition.

In one feasible implementation, the second determination unit 303 includes:

- a rotational speed acquisition subunit configured to if the slip working condition of the vehicle is the wheel-on-one-side slip working condition, acquire a real-time rotational speed of the motor and a gear request;
- a torque determination subunit configured to determine a target torque gradient according to a motor rotational speed level to which the real-time rotational speed of the motor belongs and a gear request type; and
- a correction subunit configured to acquire an initial output torque of the vehicle, and correct the initial output torque according to the target torque gradient to obtain a slip output torque in the wheel-on-one-side slip working condition.

In one feasible implementation, the torque determination subunit includes:

- a loading torque gradient subunit configured to if the gear request is an upshift request, determine a loading torque gradient with a corresponding level according to the motor rotational speed level; and
- an unloading torque gradient subunit configured to if the gear request is a downshift request, determine an unloading torque gradient with a corresponding level according to the motor rotational speed level,
- wherein the motor rotational speed level is matched with a level of the loading torque gradient and a level of the unloading torque gradient, the unloading torque gradient changes linearly with a change of the motor rotational speed level, and the loading torque gradient changes linearly with the change of the motor rotational speed level.

In one feasible implementation, the second determination unit 303 further includes:

- a current acquisition subunit configured to, if the slip working condition of the vehicle is the wheel-on-two-side slip working condition, acquire an operating current of the motor in a steady state working condition; and
- a calculation subunit configured to acquire a slip output torque in the wheel-on-two-side slip working condition according to the operating current of the motor in the steady state working condition and preset motor parameters.

In one feasible implementation, the execution unit 304 includes:

- a calculation subunit configured to calculate a torque difference between the slip output torque and a target output torque;
- a first determination subunit configured to if the torque difference is greater than a fourth threshold, determine the slip output torque as the actual output torque; and a second determination subunit configured to if the torque difference is less than or equal to the fourth threshold, determine the target output torque as the actual output torque.

Figure 4:
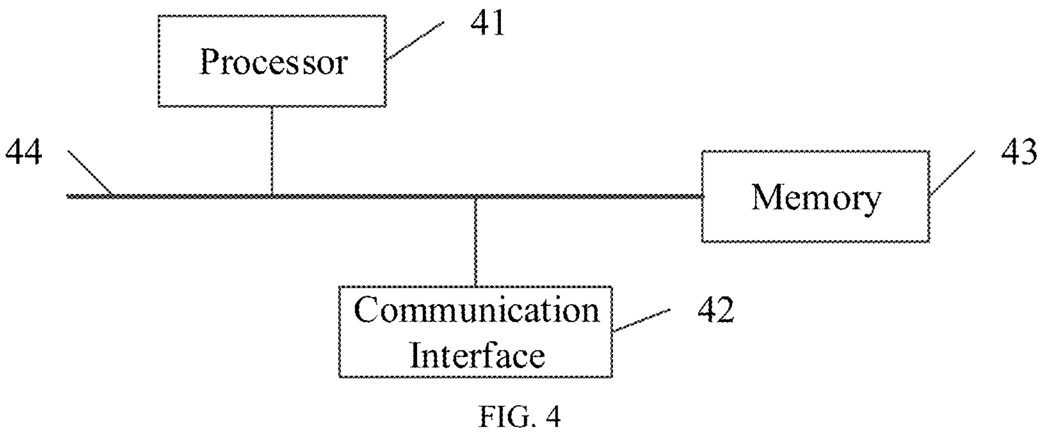
FIG. 4 is a schematic diagram of functional modules of an electronic device according to an embodiment of the present disclosure.

Based on the same inventive concept, another embodiment of the present disclosure provides an electronic device, as shown in FIG. 4, including a processor 41, a communication interface 42, a memory 43 and a communication bus 44, wherein the processor 41, the communication interface 42 and the memory 43 communicate with each other through the communication bus 44, the memory 43 is configured to store a computer program; and the processor 41 is configured to, when executing the computer program stored in the memory 43, implement the steps in the first aspect of the embodiment of the present disclosure.

The communication bus mentioned in the above-mentioned terminal can be a peripheral component interconnect (PCI) bus, an extended industry standard Architecture (EISA) bus, or the like. The communication bus can be divided into an address bus, a data bus, a control bus, or the like. For facilitating expression, only one thick line is used to represent the bus in the figure, but it does not mean that there is only one bus or one kind of bus.

The communication bus is configured to implement communication between the above-mentioned terminal and each of other devices.

The memory can include a random access memory (RAM) or a non-volatile memory, such as at least one magnetic disk memory. Optionally, the memory can also be a storage system away from the above-mentioned processor.

The above-mentioned processor can be a general-purpose processor including a central processing unit (CPU), a network processor (NP), and the like; and can also be a digital signal processing (DSP), an application specific integrated circuit (ASIC), a field-programmable gate array (FPGA) or other programmable logic devices, discrete gates or transistor logic devices or discrete hardware components.

In another embodiment of the present disclosure, there is further provided a vehicle, including the slip control apparatus in the second aspect of the embodiment of the present disclosure.

It should be understood by those skilled in the art that the embodiments of the present disclosure can be provided as methods, systems or computer program products. Therefore, embodiments of the present disclosure may take the form of an entirely hardware embodiment, an entirely software embodiment or an embodiment combining software and hardware aspects. Moreover, the embodiments of the present disclosure may take the form of computer program products executed on one or more computer usable vehicles (including, but not limited to a magnetic disk memory, a compact disc read-only memory (CD-ROM) and an optical memory) in which computer usable program codes are embodied.

The embodiments of the present disclosure are described with reference to process diagrams and/or block diagrams of the method, the terminal device (system) and the computer program product according to the embodiments of the present disclosure. It should be understood that each process and/or block in the process diagrams and/or block diagrams as well as combinations of processes and/or blocks in the process diagrams and/or block diagrams can be realized by computer program instructions. The computer program instructions can be provided to a general-purpose computer, a special-purpose computer, an embedded processor or processors of other programmable data processing terminal devices to generate a machine, such that a system for achieving functions specified in one or more processes in the process programs and/or one or more blocks in the block diagrams is generated by means of the instructions executed by the computer or the processors of other programmable data processing terminal devices.

These computer program instructions can also be stored in a computer-readable memory capable of guiding the computer or other programmable data processing terminal devices to work in a specific way, such that the instructions stored in the computer-readable memory generate a product including an instruction system, and the instruction system achieves the functions specified in the one or more processes in the process diagrams and/or one or more blocks in the block diagrams.

These computer program instructions can also be loaded in the computer or other programmable data processing terminal devices, such that a series of operation steps are executed on the computer or other programmable data processing terminal devices to generate processing realized by the computer, and furthermore, the instructions executed on the computer or other programmable data processing terminal devices provide steps for achieving the functions specified in the one or more processes in the process diagrams and/or one or more blocks in the block diagrams.

Finally, it should be further noted that relational terms such as first and second described herein are only used to distinguish one entity or operation from another one, but do not necessarily require or imply the presence of any such actual relationship or order between these entities or operations. "And/or" means that any one of both can be selected, or both can be selected. Moreover, terms "includes", "including" or any other variants thereof are intended to cover non-excludable inclusion, such that a process, method, article or terminal including a series of elements not only includes those elements, but also includes other elements not listed clearly, or further includes inherent elements of the process, method, article or terminal. In the case that there are no more limitations, elements defined by the word "including a . . . " do not exclude other same elements further existing in the process, method, article or terminal including the elements.

The slip control method and apparatus, the electronic device and the storage medium provided in the present disclosure have been introduced above in detail. The principle and implementations of the present disclosure have been described by applying specific examples in the present disclosure, and the description for the above-mentioned embodiments is only intended to help the understanding of the method and a core concept thereof in the present disclosure; at the same time, specific implementations and the application scope can be both changed by those of ordinary skill in the art according to the concept of the present disclosure. In conclusion, the content of the present description should not be understood as a limitation on the present disclosure.

What is claimed is:

1. A slip control method, characterized in that the method comprises:

acquiring a wheel speed of each wheel of a vehicle in response to a working condition that the vehicle is in a launch starting execution stage;

determining a slip working condition of the vehicle according to the wheel speed of each wheel;

acquiring one or more motor operating parameters of the vehicle, and determining a slip output torque of the vehicle according to the slip working condition of the vehicle and the motor operating parameters; and adjusting an actual output torque of the vehicle according to the slip output torque, and controlling a motor to operate at the adjusted actual output torque;

wherein the step of determining the slip working condition of the vehicle according to the wheel speed of each wheel comprises:

if a rotational speed difference between a rotational speed of a front wheel and a rotational speed of a rear wheel on any same side of the vehicle is greater than a first threshold, determining that the slip working condition of the vehicle is a wheel-on-one-side slip working condition; and if a rotational speed of a left rear wheel of the vehicle is greater than a preset second threshold and a rotational speed of a right rear wheel of the vehicle is greater than a preset third threshold, determining that the slip working condition of the vehicle is a wheel-on-two-side slip working condition.

2. The method according to claim 1, wherein the step of acquiring the motor operating parameters of the vehicle, and determining the slip output torque of the vehicle according to the slip working condition of the vehicle and the motor operating parameters comprises:

if the slip working condition of the vehicle is the wheel-on-one-side slip working condition, acquiring a real-time rotational speed of the motor and a gear request;

determining a target torque gradient according to a motor rotational speed level to which the real-time rotational speed of the motor belongs and a gear request type; and acquiring an initial output torque of the vehicle, and correcting the initial output torque according to the target torque gradient to obtain a slip output torque in the wheel-on-one-side slip working condition.

3. The method according to claim 2, wherein the step of determining the target torque gradient according to the motor rotational speed level to which the real-time rotational speed of the motor belongs and the gear request type comprises:

if the gear request is an upshift request, determining a loading torque gradient with a corresponding level according to the motor rotational speed level; and if the gear request is a downshift request, determining an unloading torque gradient with a corresponding level according to the motor rotational speed level, wherein the motor rotational speed level is matched with a level of the loading torque gradient and a level of the unloading torque gradient, the unloading torque gradient changes linearly with a change of the motor rotational speed level, and the loading torque gradient changes linearly with the change of the motor rotational speed level.

4. The method according to claim 1, wherein the step of acquiring the motor operating parameters of the vehicle, and determining the slip output torque of the vehicle according to the slip working condition of the vehicle and the motor operating parameters comprises:

if the slip working condition of the vehicle is the wheel-on-two-side slip working condition, acquiring an operating current of the motor in a steady state working condition; and acquiring a slip output torque in the wheel-on-two-side slip working condition according to the operating current of the motor in the steady state working condition and preset motor parameters.

5. The method according to claim 4, wherein a calculation formula of acquiring the slip output torque in the wheel-on-two-side slip working condition according to the operating current of the motor in the steady state working condition and preset motor parameters is as follows:

$$T_{rq} = n_p[\Phi_f i_q + (L_d - L_q) i_d i_q],$$

wherein $T_{rq}$ is the slip output torque, $n_p$ is a quantity of pole pairs of the motor, $\Phi_f$ is a flux linkage of a permanent magnet, $L_d$ is a d-axis inductance of a stator winding, $L_q$ is q-axis inductance of the stator winding, $i_d$ is a d-axis current of the motor in the steady state working condition, and $i_q$ is a q-axis current of the motor in the steady state working condition.

6. The method according to claim 1, wherein the step of adjusting the actual output torque of the vehicle according to the slip output torque comprises:

calculating a torque difference between the slip output torque and a target output torque;

if the torque difference is greater than a fourth threshold, determining the slip output torque as the actual output torque; and if the torque difference is less than or equal to the fourth threshold, determining the target output torque as the actual output torque.

7. A non-transitory computer-readable storage medium having a computer program stored thereon, wherein when the computer program is executed by a processor, the method according to claim 1 is implemented.

8. An electronic device, comprising a processor, a communication interface, a memory and a communication bus, wherein the processor, the communication interface and the memory communicate with each other through the communication bus;

the memory is configured to store a computer program; and the processor is configured to, when executing the computer program stored in the memory, implement the method according to claim 1.

* * * * *